(12) United States Patent
Jordan (10) Patent No.: US 7,055,302 B2
(45) Date of Patent: Jun. 6, 2006

(54) TRAVELING DEVICE, MOUNTED ON A VEHICLE, REMOVING AND REDUCING THE SIZE OF TREES GROWING A ROW

(75) Inventor: Ernst Jordan, Neustadt (DE)

(73) Assignee: Petra Jordan, Neustadt (DE)

(*) Notice: Subject to any disclaimer, the term of this patent is extended or adjusted under 35 U.S.C. 154(b) by 0 days.

(21) Appl. No.: 10/488,660

(22) PCT Filed: Aug. 30, 2002

(86) PCT No.: PCT/DE02/03187

§ 371 (c)(1),
(2), (4) Date: Jun. 17, 2004

(87) PCT Pub. No.: WO03/024197

PCT Pub. Date: Mar. 27, 2003

(65) Prior Publication Data

US 2004/0231310 A1    Nov. 25, 2004

(30) Foreign Application Priority Data

Sep. 4, 2001    (DE) ............................ 101 43 225

(51) Int. Cl.
*A01D 34/00* (2006.01)
(52) U.S. Cl. ....................................................... 56/500
(58) Field of Classification Search ............... 56/500, 56/503; 144/34.1, 34.2, 34.5, 337, 4.1, 24.12; 37/302, 301
See application file for complete search history.

(56) References Cited

U.S. PATENT DOCUMENTS

| 3,661,333 A | * | 5/1972 | Smith ........................ 241/281 |
| 3,925,969 A | * | 12/1975 | Shunichi ..................... 56/13.9 |
| 4,043,366 A | * | 8/1977 | Pallari ....................... 144/34.5 |
| 4,158,945 A | | 6/1979 | Burke |
| 4,232,719 A | * | 11/1980 | Payton ....................... 144/34.1 |
| 4,236,554 A | * | 12/1980 | Nicholson ................... 144/34.1 |
| 4,338,985 A | | 7/1982 | Smith et al. |
| 4,355,670 A | * | 10/1982 | Ohrberg et al. ............. 144/34.1 |

(Continued)

FOREIGN PATENT DOCUMENTS

DE    25 44 027    9/1976

(Continued)

Primary Examiner—Árpád Fábián Kovács
(74) Attorney, Agent, or Firm—Collard & Roe, P.C.

(57) ABSTRACT

The invention relates to a traveling device, which can be preferably mounted on a vehicle, provided for completely removing and reducing the size of trees, particularly fruit trees, which are growing in a row, including their roots. The device comprises a cutting tool for reducing the size of the trees fed thereto, an ejector, which is mounted on the cutting tool and provided for ejecting the trees cut in the cutting tool, and a feed device that, in a direction of travel, is located in front of the cutting tool and provided for feeding the trees to be cut into the cutting tool. The feed device comprises two driven, vertical draw-in rollers, which are located close to the ground and form a gap. When operating the device, these rollers seize trees that are pushed down in the direction of travel, squeeze them inside the gap and push them toward the cutting tool. The feed device also comprises at least one driven clearing roller placed in the ground whereby being situated transversal to the direction of travel. When the device is operated, this clearing roller seizes roots of the pressed-down trees located in the ground and pushes them upward so they can be fed to the cutting tool.

18 Claims, 4 Drawing Sheets

U.S. PATENT DOCUMENTS

| | | | |
|---|---|---|---|
| 4,683,924 A * | 8/1987 | Cornelius | 144/4.1 |
| 4,784,195 A | 11/1988 | Eggen | |
| 5,509,488 A * | 4/1996 | Merilainen | 172/63 |
| 5,727,610 A * | 3/1998 | Isley | 144/4.1 |
| 5,785,101 A * | 7/1998 | Wildey | 144/4.1 |
| 6,189,585 B1 * | 2/2001 | Johansson | 144/248.5 |

FOREIGN PATENT DOCUMENTS

| | | |
|---|---|---|
| DE | 31 28 466 | 1/1983 |
| DE | 42 09 947 | 9/1993 |
| DE | 44 16 195 | 11/1994 |
| DE | 299 17 330 | 3/2000 |
| FR | 2 293 870 | 7/1976 |

* cited by examiner

TRAVELING DEVICE, MOUNTED ON A VEHICLE, REMOVING AND REDUCING THE SIZE OF TREES GROWING A ROW

CROSS REFERENCE TO RELATED APPLICATIONS

Applicant claims priority under 35 U.S.C. §119 of German Application No. 101 43 225.9 filed Sep. 4, 2001. Applicant also claims priority under 35 U.S.C. §365 of PCT/DE02/03187 filed Aug. 30, 2002. The international application under PCT article 21(2) was not published in English.

BACKGROUND OF THE INVENTION

1. Field of the Invention

The invention relates to a travelling device, which can be preferably mounted on a vehicle, provided for completely removing and reducing the size of trees, which are growing in a row.

2. The Prior Art

Trees within the scope of the present invention are to be understood as all trees and bushes together with their roots and branches whose roots branch in the ground or are anchored by a only relatively small amount. Thus, preferably low-growing strains having a height of about three to four meters are involved.

Trees which are growing in a row especially include fruit trees on fruit plantations. It is known that after a certain time fruit trees planted in a row on fruit plantations need to be removed and replaced by new young fruit trees since the harvested fruit no longer satisfies the requirements imposed, for example, on colour, shape, taste or keeping quality. Thus, apple trees are renewed about every ten years since the harvested apples from older trees no longer exhibit a red colour typical of the species but in the meantime exhibit a yellow colour.

For replanting it is known that the old trees are sawn off by hand, using a chain saw or the like, just above the ground and laid down, also by hand, next to the tree stumps, the so-called stubs, which initially remain in the ground. The sawn-off trees are then fed to a chipper, again by hand, which reduces the size of the sawn-off trees into small wood chips. Such chippers have been used in practice for decades and are constructed as attachment, superstructure or trailer systems in various sizes and designs. Depending on the type of tools, the chippers are designated as disk, drum or screw chippers. The stubs of the old trees left in the ground are removed in a separate working process using a special stub milling cutter.

A disadvantage with this method of removing the old trees is that a plurality of separate work steps must be carried out, predominantly by hand, to remove the old trees together with the stubs. This time-consuming, physically difficult and dangerous work is usually carried out by several workers and is correspondingly cost-intensive.

It is also known to first press around the old trees growing in a row in some way and then run over them with a mulching device which reduces the size of the old trees together with their stubs during running over and presses the wood chips thereby formed into the ground. The old trees are thus not removed.

For this purpose the mulching device usually comprises a milling cutter which destroys the tree together with stubs and presses the wood chips formed into the ground where they rot.

Pressing in the wood chips takes place over a width of around 20 cm. However, in known mulching devices the milling axis itself is about 2.5 metres wide so that the entire ground is milled and softened over this width. This has the disadvantage that the milled ground absorbs rain water especially easily and thereby becomes difficult to negotiate and difficult to plant.

Such a method also has the disadvantage that the rotting of the wood chips pressed into the ground results in overacidification of the ground which has a negative influence on the health of the newly planted trees.

It has also been found to be negative that the ground is compacted by working in and pressing in the wood chips. As a result, the ground cannot be replanted immediately but must rest for a certain time during which the wood chips pressed into the ground can at least partly rot.

Since the trees are not completely removed but are only worked into the ground, in the case of possibly diseased trees, the diseased wood is also retained in the ground and may be a source of infection for the newly planted trees. Known for example is the so-called fire blight, a bacterial disease which affects fruit trees. This disease is a serious threat for fruit growing. By working wood chips from fruit trees affected by this disease into the ground, the disease-triggering bacteria are not eliminated but can attack the newly planted trees.

In addition, various devices for felling trees and reducing the size of their branches and tops are known predominantly in forestry for facilitating the work and saving costs but these are not suitable for completely removing and reducing the size of trees growing in a row such as fruit trees or bushes.

A process and a drivable machine for felling and processing trees is first known from DE 44 16 195 A1. In this process, the tree which is to be felled is sawn off, debranched, topped and cut into logs by an operating head (harvester) which is borne by a crane. At least during topping, the tree is tilted into the horizontal position by means of an operating head, and the latter is retained such that the top of the tree is pushed into the inlet of a comminution device with the result that at least the top of the tree passes into the comminution device and is coarsely comminuted therein. The vehicle used here bears a pivotably mounted crane with an operating head, and also bears a comminution device with inlet and, optionally, bears a container which is arranged on the vehicle or is suspended thereon and into which the comminuted material is transported, from the comminution device by means of a conveyor.

With this vehicle the working processes such as felling, debranching and cutting of trees and utilisation of the waste wood thereby accumulating, which had hitherto been carried out separately, are combined. The comminuted material is collected in a container and supplied for further utilisation, for example, for combustion in heat and power plants. Advantageously here the branches and tops of the felled trees, which had hitherto been left in the forest, are used as a source of energy. Advantageously in addition, any overacidification of the forest soil by excessive quantities of rotting waste wood from trees is thereby prevented. Material, time and workers can be saved by carrying out the process steps using a single drivable machine.

Furthermore, an apparatus for picking up wood lying in swathes is known from DE 299 17 330 U1. This comprises a combination of a slicing tool with a pick-up device, consisting of a plurality of pick-up and feed rollers arranged transverse to the direction of travel, which can be attached to a forage harvester as a pre-assembly unit.

In this context, a broad deposit of felled wood lying next to the remaining stumps is designated as a swathe.

A continuous work sequence can be achieved with this apparatus by simply running over the swathe. In this case, the swathe is picked up from the ground by means of a first pick-up roller which is constructed with pick-up arbors and is guided to a slicing apparatus by means of a plurality of transport-assisting feed rollers arranged in a row after the first pick-up roller. The feed rollers are provided with transport-assisting elevations (cams) in the form of axially parallel edges. The wood chips of the comminuted swathe are brought back onto the surface by means of a deflecting device or are conveyed into a trailer which runs alongside or is towed, so that the wood chips are supplied to another economic usage, either as fuel or as fertiliser.

Finally a chopper for stalked plants and bushes which cuts down and comminutes trunks standing in a row is known from DE 42 09 947 A1. Such devices are usually attached to a tractor or the like and consist of a cutting unit, conveying elements for the trees and thinner stalked plants and bushes which have been cut down, a comminuting device and an ejecting unit for the comminuted material.

The chopper comprises a vertical rotor with a saw disk for cutting the trunks close to the ground and a vertically rotating screw conveyor located thereabove which seizes the incoming stalked plants and bushes and feeds them almost in perpendicular flow to the cutting disks which are arranged between the sawing disk and the screw conveyor. The comminuted material is ejected laterally into a conveyor pipe.

However, all the methods and apparatus described previously have not proved suitable in practice for completely removing and reducing the size of trees growing in a row in an economical fashion. In all cases, expensive subsequent removal of the tree stump remaining in the ground is required.

SUMMARY OF THE INVENTION

On the basis of this prior art, the object of the invention is to provide a travelling device, which can be preferably mounted on a vehicle, provided for completely removing and reducing the size of trees, particularly fruit trees, in a continuous working sequence.

This object is achieved with a travelling device, which can be preferably mounted on a vehicle according to the invention.

The travelling device, which can preferably be mounted on a vehicle, comprises a cutting tool for reducing the size of the trees fed thereto, an ejector, which is mounted on the cutting tool and provided for ejecting the trees cut in the cutting tool, and a feed device that, in a direction of travel, is located in front of the cutting tool and provided for feeding the trees to be cut in the cutting tool.

According to the invention the device is characterised in that the feed device comprises two driven, vertical draw-in rollers located close to the ground and forming a gap, which rollers, when operating the device, seize trees which have previously been pressed down in the direction of travel, squeeze them inside the gap and push them towards the cutting tool. In addition, the feed device comprises at least one driven clearing roller located in the ground transverse to the direction of travel, which, when operating the device, seizes roots of the pressed-down trees located in the ground and pushes them upward so that they can be fed to the cutting tool.

As a result of the apparatus according to the invention, it is possible to remove and reduce the size of the trees growing in a row together with their branches and roots in a simple fashion in only one working process and in a continuous working sequence.

For this purpose, for example, the device is driven up to a tree standing in a row and which has been pressed down in some way in the direction of travel, wherein the device itself is located in a row with the trees. As the device operates continuously, the pressed-down tree is seized by the two rotating draw-in rollers and is aligned towards the gap formed by the draw-in rollers by the direction of rotation of the two draw-in rollers. During further operation of the device, the tree is squeezed inside the gap and pushed in the direction of the cutting tool.

By using at least one rotating clearing roller located in the ground transverse to the direction of travel, it is now achieved that the pressed-down tree, which is at least partly still anchored with its roots in the ground, is seized by the roots and pushed upwards.

The draw-in rollers then push the tree together with its roots further towards the cutting tool where said tree, beginning at the root, is reduced in size in an inherently known fashion and the tree material, reduced in size, is collected by means of an ejector, for example, in a container. The collected tree material, reduced in size, can be sold as fuel to heat and power stations or used as fertilizer.

The roots of the trees to be removed must not be anchored too deeply in the ground for the device according to the invention to function.

In particular, the stubs of fruit trees planted in a row in fruit plantations have only slightly branched roots which are thus only slightly anchored in the ground. This can be attributed to the fact that these trees are low-growing strains which are only about three to four metres tall.

As a result of the complete removal of the trees planted in a row, new young trees or bushes can advantageously be planted immediately since no residue remains in the ground and no compaction of the ground takes place.

In addition, diseased trees can be removed easily and completely by the device according to the invention so that the felled tree material does not present a further source of infection for neighbouring trees which are still healthy. In particular, bacterial diseases of fruit trees, such as fire blight, which occur in fruit plantations can thereby be quickly and easily controlled. No wood affected by pathogens thus remains in the ground.

The use of a travelling device with which trees can be completely removed and reduced in size in a rapid and continuous working sequence in one working process results in a general reduction in costs.

In particular, the otherwise very dangerous and physically difficult work of clearing low-growing strains in fruit plantations is made easier.

In a suitable embodiment of the invention, the two draw-in rollers are constructed as cylindrical and are arranged parallel to one another. Between them the two draw-in roller form a gap of constant width.

In a preferred embodiment of the invention it is provided that the draw-in rollers are constructed as conical, wherein the longitudinal axes of the draw-in rollers are arranged parallel to one another. As a result of the conical shape, the draw-in rollers form a gap whose width at the lower end is greater than that at the upper end.

This arrangement has the advantage that the rollers need not be moved so far from one another when the stub of the tree is seized by the root because the gap at the lower end is wider and the stub can more easily pass through this region. Compared with cylindrical rollers, the conical rollers thus do not need to be opened and closed so frequently. They are thus not moved away from one another and towards one another so frequently. In addition, the rollers are mounted such that they can be exchanged easily and such that if required, the conical rollers can be replaced by cylindrical rollers and conversely.

A further development of the invention provides that the clearing roller is arranged in the direction of travel behind the draw-in rollers.

It is thereby achieved that for example, a tree is first seized by the draw-in rollers, squeezed and pushed towards the cutting tool, wherein the root of the tree which is at least partly anchored in the ground forms a resistance. During subsequent operation of the device however, the clearing roller rotating in the ground pushes the tree root out of the ground so that the resistance is lifted and the tree together with root and branches is fed to the cutting tool.

A roller which is located before the draw-in rollers in the direction of travel and which rotates in the ground certainly solves the formulated object but it has been found that the branches of a tree seized by the draw-in rollers can partly jam at the support of the clearing roller and then form a resistance during drawing in.

In order that the clearing roller reliably seizes the roots of the tree or bush to be removed and pushes them upwards out of the ground, the clearing roller preferably has radially outwardly directed spikes. The clearing roller is preferably arranged so that it rotates at a depth of approximately 12 cm in the ground.

A further development of the invention provides that the travelling device which can be preferably mounted on a vehicle and/or the vehicle on which the device can be mounted, respectively alone or connected one to the other, comprise means for pressing down the trees which, when the device is operating, press the substantially vertically growing trees into a position as horizontal as possible on the ground, wherein the roots of the trees partly protrude from the ground.

The pressing down of trees to be removed, especially fruit trees, and the actual removal of the trees from the ground and reducing the size of the trees is thereby achieved in one working process and in a continuous working sequence.

The means is preferably a hydraulically movable jib arm on whose front end in the direction of travel there is located a pressing-down roller. The pressing-down roller is brought onto the trunk of the tree to be removed as the device is operated. As a result of the operation of the device, the tree is pressed down with the jib arm which can be moved vertically from top to bottom and conversely.

In an advantageous embodiment of the invention it is provided that the draw-in rollers have radially outwardly directed spikes. It is thereby achieved that the draw-in rollers easily seize the trees to be removed and can also push against any possible resistance towards the cutting tool. Since the spikes partly bore into the trunk of a tree or, grip behind branches, the tree to be removed is pushed particularly easily into the gap formed by the draw-in rollers, squeezed therein and conveyed to the cutting tool.

It is furthermore provided that one of the draw-in rollers is arranged positionally fixed and that the other draw-in roller is arranged such that it can be swivelled against a force directed onto the positionally fixed draw-in roller, that the width of the gap formed by the two draw-in rollers is variable and the seized trees are clamped between the two draw-in rollers. It is thereby achieved that despite different diameters, the trees are at all times squeezed between the draw-in rollers and pushed towards the cutting tool. For example, if a tree seized by the draw-in rollers has a diameter greater than a pre-determined gap width, on entry into the gap, the tree pushes the swivellably arranged draw-in roller outwards against a pre-determined force, that is, away from the positionally fixed draw-in roller. The gap width is in this case matched to the diameter of the tree trunk or the compacted tree so that at all times the tree is squeezed by the draw-in rollers, compacted and pushed towards the cutting tool.

The swivellable draw-in roller is preferably hydraulically movable for this purpose.

In a further development the direction of rotation of the driven draw-in roller is reversible. As a result, a partly drawn-in tree or bush which has somehow jammed can be pushed out of the gap of the drawn-in rollers again by reversing the direction of rotation. By reversing the direction of rotation again, the tree or bush can then be fed back to the cutting tool again.

An advantageous embodiment of the invention provides that the feed device has at least one, preferably three, driven conveyor rollers arranged transverse to the direction of travel for conveying the trees together with roots which have been lifted from the ground by the clearing roller and pushed towards the cutting tool by the draw-in rollers, wherein the conveying rollers are arranged in the direction of travel behind the clearing roller.

The conveying rollers are preferably arranged such that the trees, when these are seized by the clearing roller at the root, are transferred directly onto the conveying rollers and transported to the cutting tool.

Especially preferably, the conveying rollers are arranged in a step-shaped fashion, beginning at the ground closest to the clearing roller and ending at the cutting tool.

A further development provides that at least between two of the rollers arranged transversely in the direction of travel there is provided a recess. It is thereby achieved that any stones randomly carried along by the clearing roller can fall to the ground again through the recess and are not brought into the cutting tool.

It is provided that the device is self-propelling or movable by a vehicle such as a tractor or the like.

The cut trees blown out from the ejector together with their roots can be transferred to a container for further use. In particular, the cut wood can be sold to heat and power stations as fuel, wherein the profit achieved therefrom reduces the working costs. In addition, the wood chips of the cut wood can be used as fertilizer.

BRIEF DESCRIPTION OF THE DRAWINGS

The invention is explained below with reference to an exemplary embodiment shown in the drawings. In the figures.

DETAILED DESCRIPTION OF PREFERRED EMBODIMENTS

Figure 1:
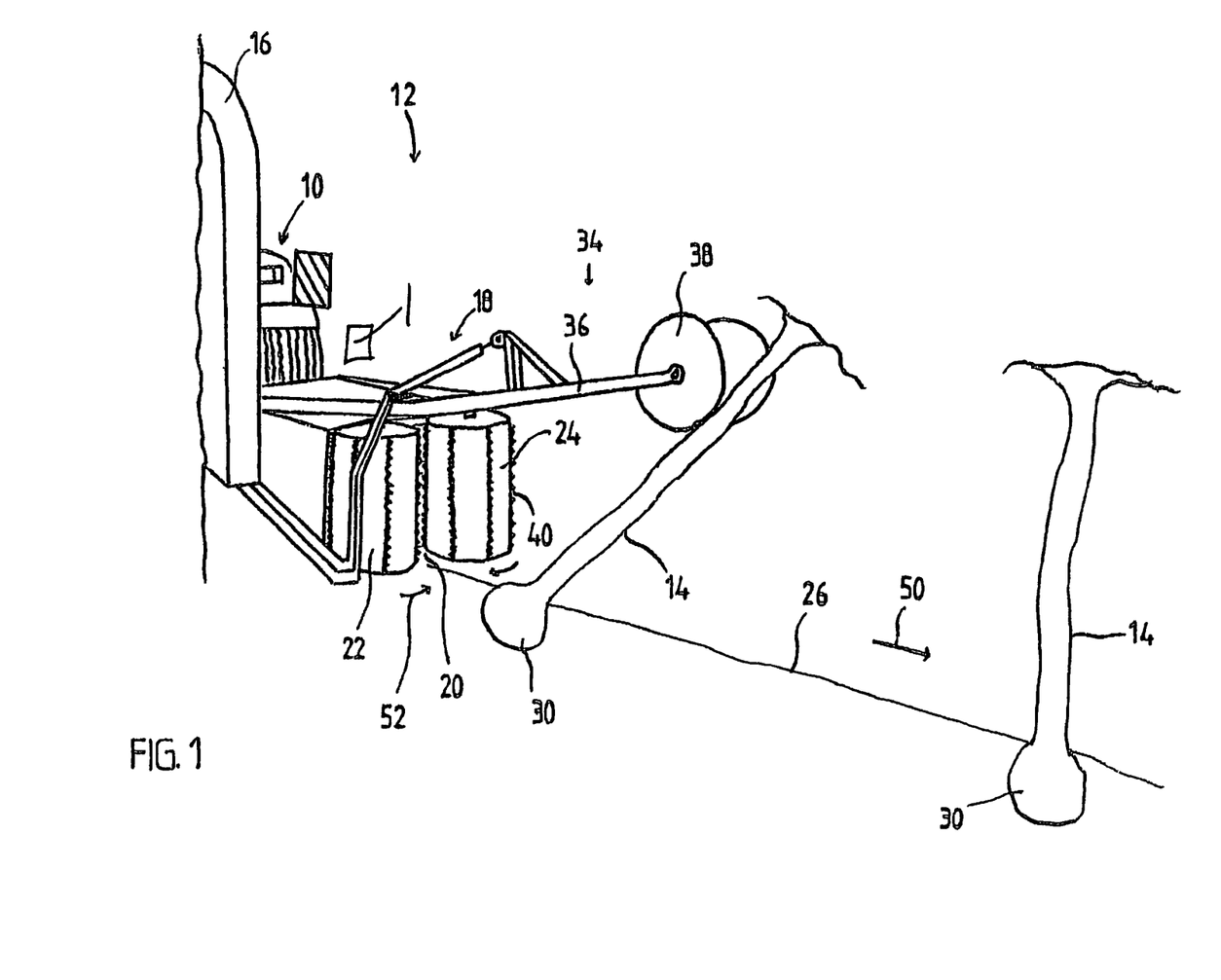
FIG. 1 is a schematic perspective view of a device according to the invention mounted on a vehicle.

FIG. 1 shows a device 12 according to the invention which is mounted on a vehicle 10, for example, a tractor which is shown only partly here.

The device 12 comprises a cutting tool 1 for reducing the size of trees 14 fed thereto, an ejector 16 mounted on the cutting tool for ejecting the trees 14 reduced in size in the cutting tool and a feed device 18 arranged in the direction of travel in front of the cutting tool for feeding the trees 14 to be reduced in size into the cutting tool. The device 12 can be driven by the vehicle 10. The direction of travel of the vehicle 10 and with this the device 12 is shown by means of the arrow 50.

The feed device 18 comprises two driven, vertical draw-in rollers 22 and 24 located close to the ground between which a gap 20 is formed. The draw-in rollers 22 and 24 have radially outwardly directed spikes 40 which seize a pressed-down tree 14 and push it towards the cutting device not shown here. In this case, the spikes 40 can easily grasp the trunk of a tree 14 or grip behind the branch forks of a tree 14. One draw-in roller 22 is positionally fixed whilst the other draw-in roller 24 is arranged such that it can be swivelled hydraulically against a force directed onto the positionally fixed draw-in roller 22 such that the width of the gap 20 formed between the two draw-in rollers 22 and 24 is variable. This is then logical if trees 14 of different diameter are to be removed. In this case, the width of the gap 20 is automatically matched to the diameter of the tree 14.

The draw-in rollers 22 and 24 are driven hydraulically wherein the direction of rotation of the draw-in rollers 22 and 24 is such that the trees 14 are drawn into the gap 20 during operation of the device 12. The direction of rotation of the draw-in rollers 22 and 24 during operation of the device 12 in the direction of travel 50 is shown in FIG. 1 by means of two further arrows 52. Should a drawn-in tree 14 jam in the gap 20 such that the tree 14 cannot be conveyed further, the direction of rotation 52 of the driven draw-in rollers 22 and 24 can be reversed and the drawn-in tree 14 can be pushed out of the gap 20 in the direction of travel 50.

The device 12 also comprises a means 34 for pressing down the trees 14 to be reduced in size. The means 34 consists of a hydraulically movable jib arm 36 and a pressing-down roller 38 attached thereto.

According to the invention, the feed device 18 also comprises a clearing roller not shown here, which is located in the ground transverse to the direction of travel 50. The clearing roller is hydraulically driven such that it seizes the roots 30 of the pressed-down trees 14 located in the ground 26 and pushes them upwards.

In order to remove and reduce the size of the trees 14 shown in FIG. 1, the device 12 mounted on a vehicle 10 is driven up to a first tree 14 by means of the vehicle 10. In this case, the device 12 is located in a row with the trees 14 growing in the row. When operating the device 12, the jib arm 36 is moved hydraulically in the vertical direction such that the pressing-down roller 38 rests on the trunk of the tree 14 to be removed. During further operation of the device 12 the tree 14 is pressed down in the direction of travel 50. For this purpose the jib arm 36 can be guided downwards in a supporting fashion.

The device 12 is now moved continuously in the direction of travel 50. The draw-in rollers 22 and 24 immediately seize the lower trunk of the tree 14, wherein the spikes 40 of the draw-in rollers 22 and 24 grasp the trunk of the tree 14 and guide and align the entire tree 14 in the gap 20.

Since the tree 14 with its root 30 is still at least partly anchored in the ground 26, it will not be pushed immediately towards the cutting tool by means of the draw-in rollers 22 and 24. The entire tree 14 with its root 30 can only be pushed into the cutting tool when, during further operation of the device 12, the root 30 of the tree 14 is grasped by the clearing roller 28, which is located behind the draw-in rollers 22 and 24 and rotates in the ground 26, and is pushed from the ground 26. In this case, the draw-in rollers 22 and 24 squeeze the tree 14 together with the branches located on the tree 14 so that said tree is forcibly drawn into the gap 20 and is pushed towards the cutting tool.

In the cutting tool the entire tree 14 together with root 30 is reduced in size and transferred by means of an ejector 16 into a container for further use, which is not shown here.

The collected trees which have been reduced in size can be sold to heat and power stations. This reduces the working costs for the removal of the trees 14 planted in a row. Compared with the prior art, in which the trees 14 are worked into the ground by means of a mulching device, the costs can thus be reduced further.

With the device according to the invention at least twice the area per day is worked compared with conventional devices at less than half the costs.

Figure 2:
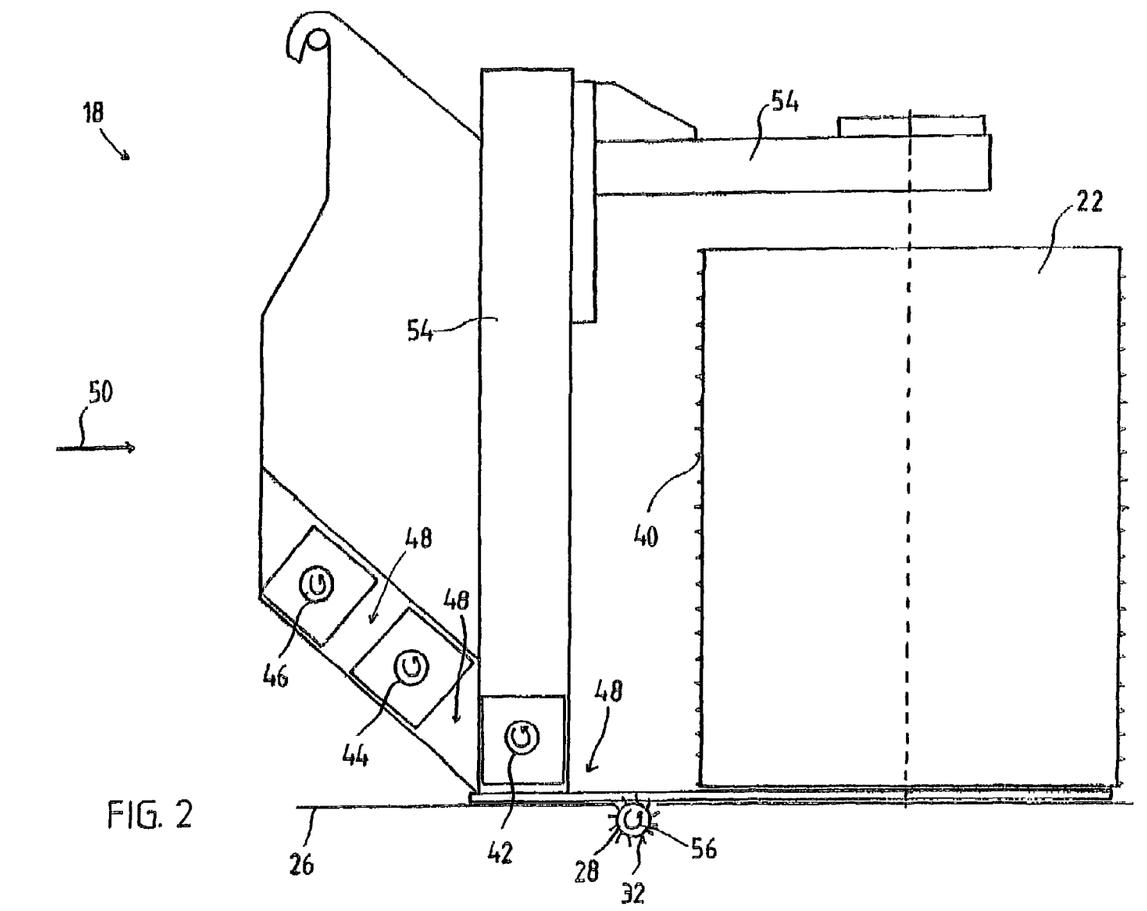
FIG. 2 is a schematic side view of the feed device of the device according to the invention and FIG. 3 is a schematic plan view of the feed device of the device according to the invention and FIG. 4 is a simplified diagram of two conical draw-in rollers.

FIG. 2 shows a schematic side view of the feed device 18.

Such a feed device 18 is arranged in front of the cutting tool in the direction of travel 50. The feed device 18 is used to feed the trees to be reduced in size into the cutting tool.

The feed device 18 comprises two draw-in rollers 22 and 24 arranged vertically, close above the ground 26, of which only one draw-in roller 22 is shown in FIG. 2. The draw-in roller 22 is hydraulically driven and has radially outwardly directed spikes 40.

In addition, the feed device 18 also comprises a likewise hydraulically driven clearing roller 28 located in the ground 26 transverse to the direction of travel 50, which is arranged after the draw-in roller 22 in the direction of travel. The direction of rotation of the clearing roller 28 is shown by the arrow 56.

The clearing roller 28 has radially outwardly directed spikes 32 which during operation of the device 12, seize the roots of the pressed-down trees located in the ground 26 and push them upwards, wherein the clearing roller 28 moves approximately at a depth of 12 cm in the ground 26.

The feed device 18 comprises three other hydraulically driven conveying rollers 42, 44 and 46 arranged transverse to the direction of travel for conveying the trees 14 lifted out of the ground 26 by the clearing roller 28 and pushed towards the cutting tool. The conveying rollers 42, 44 and 46 are arranged in the direction of travel 50 in a step fashion after the clearing roller 28 and have the same direction of rotation 56 as the clearing roller 28.

The trees pushed out of the ground by the clearing roller 28 at the root are transferred from the clearing roller 28 to the conveying rollers 42, 44, 46 and transported further to the cutting tool. Provided between the rollers 28, 42, 44 and 46 arranged transverse to the direction of travel 50 are recesses 48 through which stones conveyed with the roots from the ground can fall back onto the ground 26 before reaching the cutting tool.

All the rollers 22, 28, 42, 44 and 46 are mounted in a frame 54.

Figure 3:
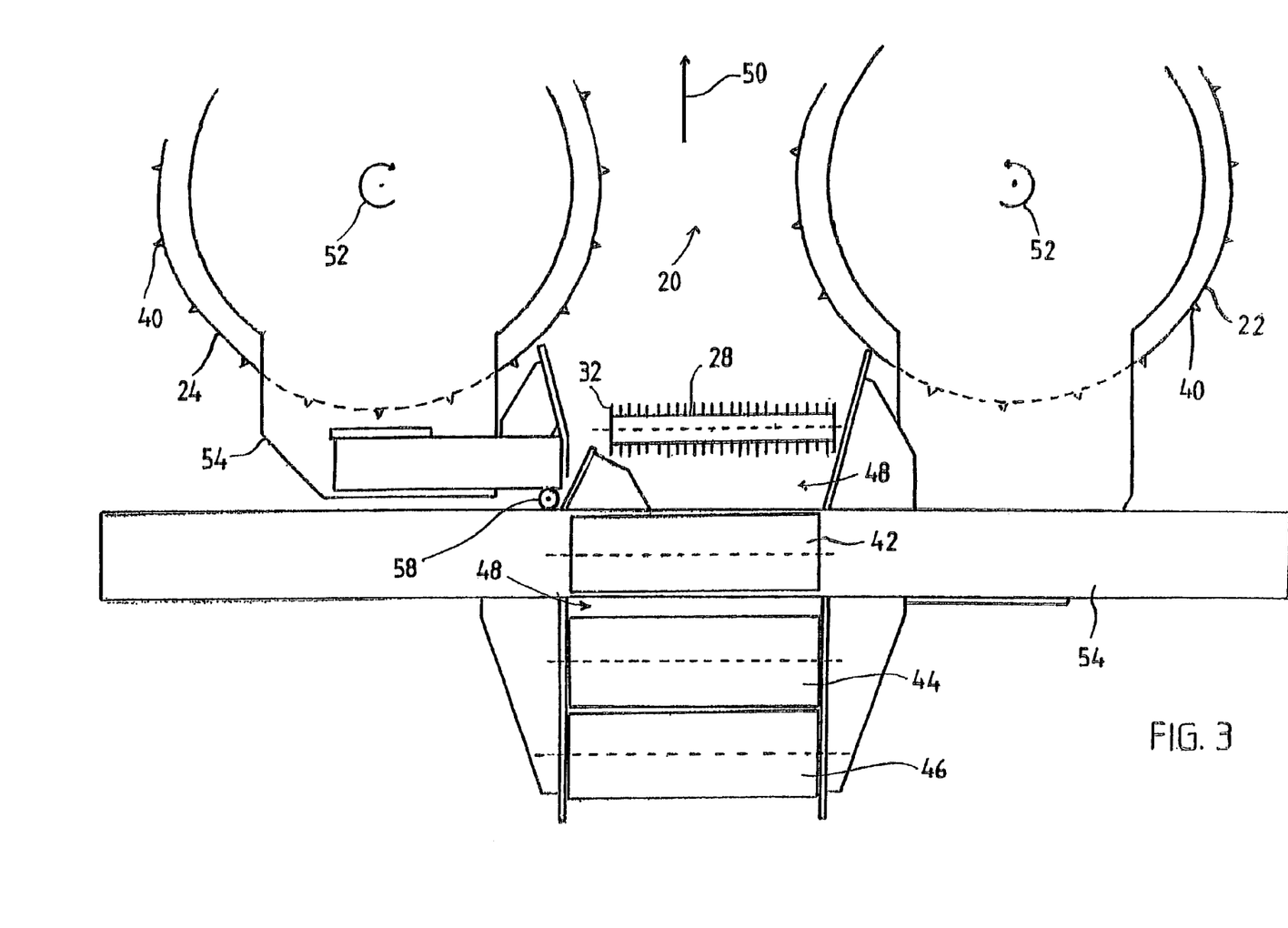

FIG. 3 shows a schematic plan view of the feed device 18.

The feed device 18 comprises two vertically arranged draw-in rollers 22 and 24 which form a gap 20. The draw-in rollers 22 and 24 have radially outwardly directed spikes 40.

Whereas one draw-in roller 22 is located positionally fixed on a frame 54, the other draw-in roller 24 can swivel hydraulically at the pivot 58 against a force directed onto the positionally fixed draw-in' roller such that the width of the gap 20 formed by the two draw-in rollers 22 and 24 varies. For example, if a tree seized by the draw-in rollers 22 and 24 has a diameter larger than the predetermined gap width, on entering into the gap 20, the tree pushes the swivellably arranged draw-in roller 24 against a predetermined force outwards, that is away from the positionally fixed draw-in roller 22. In this case, the gap width is matched to the diameter of the tree trunk or the compacted tree so that at all times the tree is squeezed by the draw-in rollers 22 and 24, compacted and pushed towards the cutting tool.

The direction of rotation of the driven draw-in rollers 22 and 24 is shown by the arrow 52 in FIG. 3.

The feed device 18 also comprises the clearing roller 28 with radially outwardly directed spikes 32 already described in FIG. 2 and the three rollers 42, 44 and 46 for conveying the trees to be reduced in size into the cutting tool.

Figure 4:
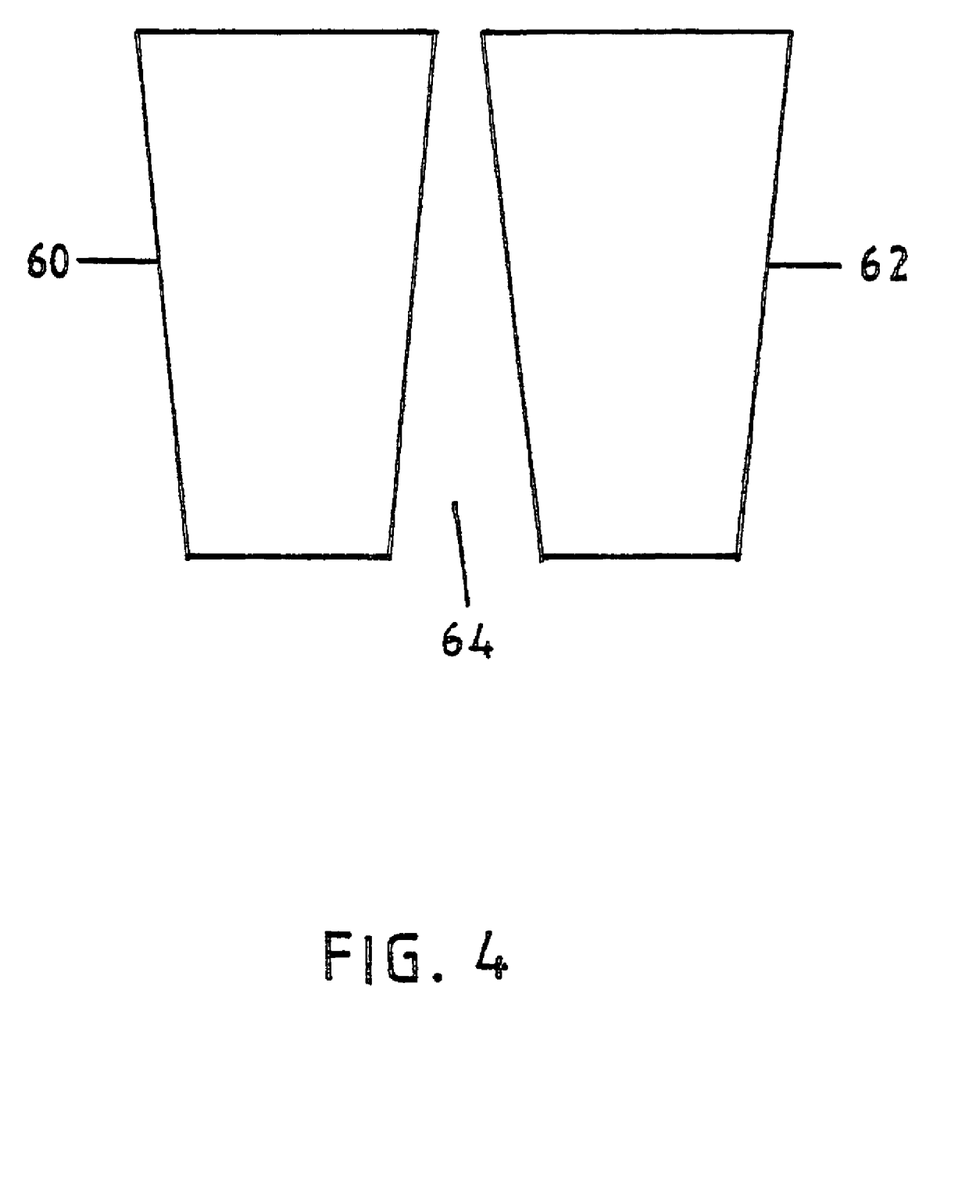

FIG. 4 shows a simplified diagram of two draw-in rollers 60, 62 which, unlike those shown in FIG. 1, are not cylindrical but are conical. The conical shape is such that the rollers have a larger diameter at the upper end than at the lower end.

As a result of the conical shape of the two draw-in rollers 60, 62, a gap 64 is formed whose width at the lower end is greater than that at the upper end. A favourable value for the gap width at the lower end is 30–40 cm.

Bearing in mind that the stub with the roots 30 of the trees 14 being considered is approximately 30–35 cm thicker than the trunk of the trees 14, as a result of the conical draw-in rollers 60, 62 with the broadened gap 64 at the lower end, it is achieved that the stubs with the roots 30 can be grasped more easily. The two draw-in rollers 60, 62 thus need not be pushed so far apart as would be the case with the cylindrical rollers 22, 24 according to FIG. 1, where the width of the gap 20 is smaller.

The invention claimed is:

1. A travelling device (12), which can be mounted on a vehicle (10), provided for completely removing and reducing the size of trees (14), which are growing in a row, comprising
    a cutting tool for reducing the size of the trees (14) fed thereto,
    an ejector (16), which is mounted on the cutting tool and provided for ejecting the trees (14) cut in the cutting tool, and
    a feed device (18) that, in a direction of travel (50), is located in front of the cutting tool and provided for feeding the trees (14) to be cut in the cutting tool,
    wherein the feed device (18) comprises two driven, vertical draw-in rollers (22, 24; 60, 62) located close to the ground and forming a gap (20), which rollers, when operating the device (12), seize trees (14) which have previously been pressed down in the direction of travel (50), squeeze them inside the gap (20) and push them towards the cutting tool, and
    that the feed device (18) comprises at least one driven clearing roller (28) located in the ground (26) transverse to the direction of travel (50), which, when operating the device (12), seizes roots (30) of the pressed-down trees (14) located in the ground (26) and pushes them upward so that they can be fed to the cutting tool.

2. The travelling device (12) which can be mounted on a vehicle (10) according to claim 1,
    wherein the draw-in rollers (22, 24) are cylindrical and are arranged parallel to one another and form a gap (20) of constant width.

3. The travelling device (12) which can be mounted on a vehicle (10) according to claim 1,
    wherein the draw-in rollers (60, 62) are conical, that the longitudinal axes of the draw-in rollers (60, 62) are arranged parallel to one another and that the conical draw-in rollers (60, 62) form a gap (64) whose width at the lower end is greater than that at the upper end.

4. The travelling device (12) which can be mounted on a vehicle (10) according to claim 1,
    wherein the clearing roller (28) is arranged in the direction of travel (50) behind the draw-in rollers (22, 24).

5. The travelling device (12) which can be mounted on a vehicle (10) according to claim 1,
    wherein the clearing roller (28) has radially outwardly directed spikes (32).

6. The travelling device (12) which can be mounted on a vehicle (10) according to claim 1,
    wherein the clearing roller (28) rotates at a depth of approximately 12 cm in the ground (26).

7. The travelling device (12) which can be mounted on a vehicle (10) according to claim 1,
    wherein the device (12) and/or the vehicle (10), alone or connected one to the other, comprise means (34) for pressing down the trees (14) which, when the device (12) is operating, push the substantially vertically growing trees (14) into a substantially horizontal position on the ground (26), wherein the roots (30) of the trees partly protrude from the ground (26).

8. The travelling device (12) which can be mounted on a vehicle (10) according to claim 7,
    wherein the means (34) is a hydraulically movable jib arm (36) on whose front end in the direction of travel (50) there is located a pressing-down roller (38).

9. The travelling device (12) which can be mounted on a vehicle (10) according to claim 1,
    wherein the draw-in rollers (22, 24; 60, 62) have radially outwardly directed spikes (40).

10. The travelling device (12) which can be mounted on a vehicle (10) according to claim 1,
    wherein the draw-in rollers (22; 60) are arranged positionally fixed and that the other draw-in rollers (24; 62) are arranged such that they can be swivelled against a force directed onto the positionally fixed draw-in rollers (22; 60), that the width of the gap (20) formed by the two draw-in rollers (22, 24) is variable and the seized trees (14) are clamped between the two draw-in rollers (22, 24; 60, 62).

11. The travelling device (12) which can be mounted on a vehicle (10) according to claim 10,
    wherein the swivellable draw-in rollers (24; 62) are hydraulically movable.

12. The travelling device (12) which can be mounted on a vehicle (10) according to claim 1,
    wherein the direction of rotation (52) of the driven draw-in rollers (22, 24; 60, 62) is reversible.

13. The travelling device (12) which can be mounted on a vehicle (10) according to claim 1,
    wherein the feed device (18) comprises at least one, conveying roller (42, 44, 46) arranged transverse to the direction of travel (50) for conveying the trees (14) together with roots (30), which have been lifted from the ground (26) by the clearing roller (28) and pushed towards the cutting tool by the draw-in rollers (22, 24;

60; 62), wherein the conveying roller (42, 44, 46) is arranged in the direction of travel (50) behind the clearing roller (28).

14. The travelling device (12) which can be mounted on a vehicle (10) according to claim 13,
wherein the conveying roller (42, 44, 46) is arranged such that the trees (14), when these are seized by the clearing roller (28) at the root (30), are transferred directly onto the conveying roller (42, 44, 46) and transported to the cutting tool.

15. The travelling device (12) which can be mounted on a vehicle (10) according to claim 14,
wherein the conveying roller (42, 44, 46) is arranged in a step-shaped fashion, beginning at the ground (26) closest to the clearing roller (28) and ending at the cutting tool.

16. The travelling device (12) which can be mounted on a vehicle (10) according to claim 1,
wherein between at least two rollers (28, 42, 44, 46) arranged transversely in the direction of travel (50) there is provided a recess (48).

17. The travelling device (12) which can be mounted on a vehicle (10) according to claim 1,
wherein the device (12) is self-propelling or movable by a vehicle (10).

18. The travelling device (12) which can be mounted on a vehicle (10) according to claim 1,
wherein the cut trees (14) coming from the ejector (16) together with their roots (30) can be transferred to a container for further use.

* * * * *